Figure 1:
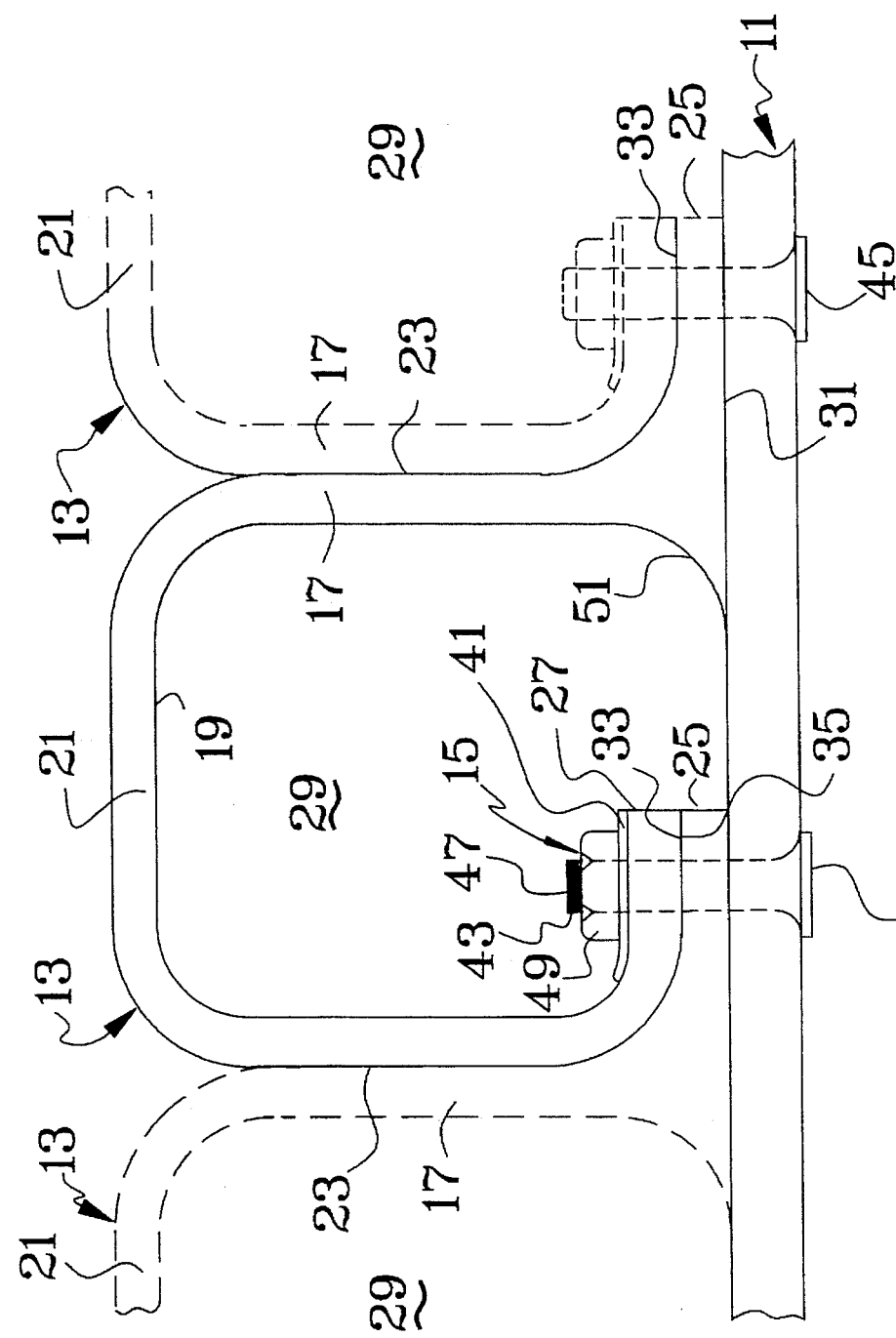

United States Patent [19]

Rollinson

[11] Patent Number: 5,478,141
[45] Date of Patent: Dec. 26, 1995

[54] GROUND ENGAGING ELEMENT

[75] Inventor: Phillip J. Rollinson, Mt Lawley, Australia

[73] Assignee: AirBoss Limited, West Perth, Australia

[21] Appl. No.: 956,015

[22] PCT Filed: Jun. 6, 1991

[86] PCT No.: PCT/AU91/00243

§ 371 Date: Jan. 11, 1993

§ 102(e) Date: Jan. 11, 1993

[87] PCT Pub. No.: WO91/18754

PCT Pub. Date: Dec. 12, 1991

[30] Foreign Application Priority Data

Jun. 6, 1990 [AU] Australia ................ PK0504

[51] Int. Cl.⁶ .................................... B60B 15/20
[52] U.S. Cl. .................. 301/44.2; 301/44.3; 305/50; 305/54
[58] Field of Search ............... 305/35 R, 35 EB, 305/39, 50, 51, 54; 301/41.1, 43, 44.1, 44.2, 44.3, 44.4

[56] References Cited

U.S. PATENT DOCUMENTS

| | | | |
|---|---|---|---|
| 1,377,450 | 5/1921 | Whipple | 305/50 X |
| 1,727,625 | 9/1929 | Zybach | 301/44.3 |
| 1,854,826 | 4/1932 | Crumb et al. | 301/44.3 |
| 2,085,980 | 7/1937 | Hutchens | 301/44.2 |
| 2,188,196 | 1/1940 | Wanek | 301/44.3 |
| 2,901,021 | 8/1959 | Booharin | |
| 5,078,454 | 1/1992 | Rollinson | 301/44.1 |
| 5,154,490 | 10/1992 | Burns | 301/43 X |

FOREIGN PATENT DOCUMENTS

| | | | |
|---|---|---|---|
| 3960288 | 2/1990 | Australia | |
| 424158 | 1/1926 | Germany | |
| 186707 | 9/1936 | Switzerland | 305/50 |
| 207632 | 12/1923 | United Kingdom | |
| 293638 | 7/1928 | United Kingdom | |
| 857439 | 12/1960 | United Kingdom | |

*Primary Examiner*—Russell D. Stormer
*Attorney, Agent, or Firm*—Handal & Morofsky

[57] ABSTRACT

The invention provides a ground engaging element for a wheel or endless track which element has a hollow longitudinal body of flexible material to extend across the wheel or track. The hollow body has a pair of longitudinal side walls and an outer longitudinal face for contacting the ground as well as first and second mounting flanges. The first mounting flange extends outwardly of the hollow body and has a mounting face to contact the wheel or track base. The second mounting flange is disposed between the side walls and has a face disposable in spaced relationship to the base whereby the first mounting flange of a similar, neighboring ground engaging element can be received under the face of the second mounting flange. Neighboring ground engaging elements can be mounted on the wheel or track with the side walls in contact to provide mutual support under ground engaging loads.

8 Claims, 2 Drawing Sheets

5,478,141

GROUND ENGAGING ELEMENT

This invention relates to ground engaging elements for wheels and endless tracks for motor vehicles and to wheels and endless tracks incorporating such ground engaging elements.

In one form the invention resides in a ground engaging element for mounting on a base, comprising a hollow body of resiliently flexible material, the hollow body having first and second mounting flanges, the first mounting flange extending outwardly and having a mounting face adapted to contact said base and a further face space from said mounting face, the second mounting flange having a face so disposed as to be spaced from the base when the mounting face of the first mounting flange is in contact with the base whereby the first mounting flange of a similar ground engaging element can be received in said space with the face of said second mounting flange in contact with said further face of the first mounting flange.

With this arrangement, two of said ground engaging elements disposed in side by side relation can be secured to said base with the first mounting flange of one element disposed between the base and the second mounting flange of the other element, and those two mounting flanges being fixed to the base by any suitable fixing means such as one or more fixing bolts passing through aligned holes formed in the two mounting flanges.

Preferably the hollow body has a pair of longitudinal side faces, and an outer longitudinal face for contacting the ground.

Preferably, said longitudinal side faces are generally planar and so arranged as to be generally normal to the plane of said base.

Preferably, the junction between each side wall and the adjacent mounting flange is curved.

Preferably, a stabilizing flange is provided on the side of the body corresponding to said first mounting flange to extend inwardly of the body.

Preferably, the hollow body is substantially tubular and open along a longitudinal portion thereof, said open longitudinal portion being disposed so as to confront said base when the element is fixed to said base. Preferably the ends of the tubular body are open.

In circumstances where the ground engaging element forms part of a wheel for a motor vehicle, said base to which the ground engaging element is fixed may be in the form of a rim of the wheel.

In circumstances where the ground engaging element forms part of an endless track of a motor vehicle, said base to which the ground engaging element is fixed may comprise an endless band passing around spaced end rollers. The combination of the endless band and the ground engaging elements mounted thereon provide the endless track.

In another form the invention resides in a wheel comprising a rim and a plurality of ground engaging elements as aforesaid mounted on the periphery of said rim to provide a ground engaging surface. The resilient nature of the ground engaging elements provides cushioning for the ground engaging surface.

In still another form the invention resides in an endless track for a vehicle comprising an endless band and a plurality of ground engaging elements as aforesaid mounted on the band to provide a ground engaging surface. The resilient nature of the ground engaging elements provides cushioning for the ground engaging surface. The endless base may be in the form of a continuous flexible band which is able to flex so as to provide further cushioning for the vehicle.

Preferably, neighboring ground engaging elements are closely associated with each other to provide mutual support when deflecting under load.

Figure 2:
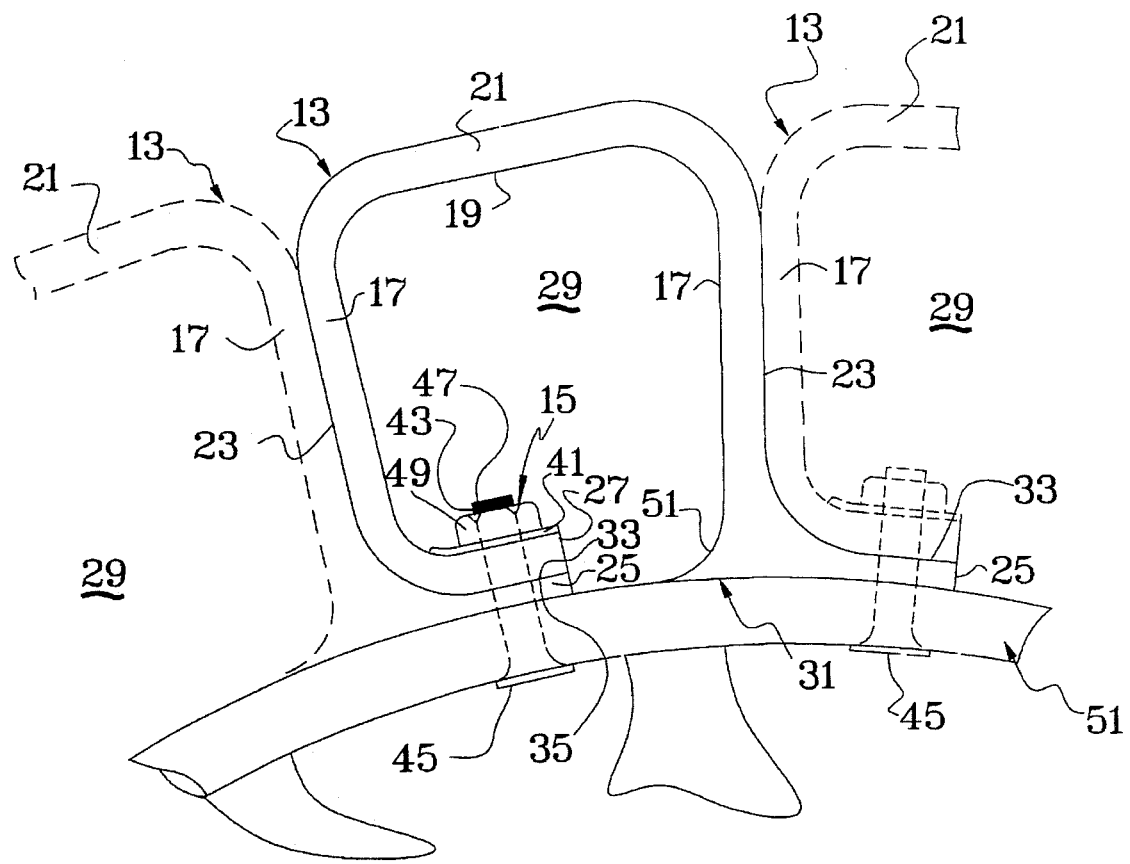

The invention will be better understood by reference to the following description of one specific embodiment thereof as shown in the accompanying drawings in which:

FIG. 1 is a fragmentary schematic side view of an endless track for a tracked vehicle, showing one ground engaging element in bold lines and neighboring elements in phantom lines; and FIG. 2 is a similar view of a wheel.

The embodiment shown in the drawings is directed to an endless track for a tracked vehicle. The endless track comprises an endless flexible band 11 mounted between a pair of end rollers (not shown) of the track. In this embodiment, the endless band is of one piece construction and is constructed from reinforced, resiliently flexible material.

A plurality of ground engaging elements 13 are detachably fixed to the endless band 11 by way of fixing means 15 to be described in more detail later.

Each ground engaging element 13 is in the form of a hollow body of tubular form. The hollow body is elongated and is arranged to extend across the endless band 11 in a direction substantially perpendicular to the direction of travel of the endless track. The hollow body includes a pair of spaced longitudinal side walls 17 and a longitudinal outer wall 19 which has an outer face 21 arranged for contacting the ground. A tread may be provided on the outer face 21 if desired. Each side wall 17 has a longitudinal outer face 23 which is substantially normal to the plane of the endless band 11, as shown in the drawings.

Each ground engaging element 13 is provided with a first mounting flange 25 and a second mounting flange 27. The first mounting flange 25 extends outwardly of one longitudinal side wall 17 in the direction away from the cavity 29 defined within the hollow body. The second mounting flange 27 extends inwardly from the other longitudinal side wall 17 towards the cavity 29. The two mounting; flanges 25 and 27 also extend along the length of the hollow body.

The first mounting flange 25 has a mounting face 31 which is adapted to contact the outer face 12 of the endless band 11 when the ground engaging element is in position on the endless band. Additionally, the first mounting flange 25 has a further face 33 spaced from the mounting face 31, said further face 33 being the outer face of the mounting flange.

The second mounting flange 27 has a face 35 which is so disposed to be spaced from the endless band 11 when the mounting face 31 of the first mounting flange is in contact with the endless band whereby a first mounting flange 25' of a neighboring element 13' can be received in said space with the face 35 of said second mounting flange in contact with said further face 33' of the first mounting flange of said neighboring element 13'.

The co-operating first and second flanges of neighboring ground engaging elements 13 and 13' are fixed to the base 11 by fixing means 15 as previously mentioned. The fixing means 15 is in the form of a clamping plate 41 which bears against the outer face of the second mounting flange 27 of element 13 and a plurality of bolts 43 each having a head 45 countersunk into the inner face of endless band 11 and a threaded shank 47 which extends through aligned apertures (not shown) in the co-operating first and second flanges 25' and 27 as well as in the clamping plate 41 to receive a nut 49 which co-operates with the bolt and clamping plate to retain the co-operating mounting flanges in position.

The ground engaging element 13 is provided with a stabilizing flange 51 which extends inwardly of the longitudinal side wall 17 on which is provided with the first mounting flange 25. The stabilizing flange 51 has an inner face which is integral with and planar with the mounting face 31 of the first mounting flange 33.

When the ground engaging elements 13 are secured to the endless band 11, the outer faces 23 of neighboring longitudinal side walls 17 are in contact with each other so as to provide mutual support when under load.

As shown in the drawings, the Junctions between the outer wall 21 and the side walls 17 are curved. Similarly, the junctions between the side walls 17 and the respective first and second mounting flanges 25 and 27 respectively are also curved.

The assembly of the ground engaging elements 13 and the endless base 12 provide a ground engaging surface for the endless track. The ground engaging surface is cushioned by virtue of the resilient nature of the ground engaging elements 13. This provides cushioning for the vehicle and additional cushioning is provided by virtue of the resilient nature of the endless band 11.

It should be appreciated that the scope of the invention is not limited to the scope of the embodiment described. In particular, while the embodiment has been described in relation to endless tracks for vehicles, it should be appreciated that the invention can also be applied to wheels for example, as shown in FIG. 2. In this regard, the ground engaging elements would be mounted around the periphery of a rim 51 to provide a wheel assembly having a ground contacting surface which is cushioned by virtue of the resilient nature of the ground engaging elements.

Additionally, while in the embodiment which has been described the elements extend across the track or wheel in a direction which is normal to the direction of travel, it should be understood that the elements could be disposed obliquely with respect to the direction of travel. Furthermore, while in this embodiment described the elements are straight lengthwise, they could be of any suitable shape such as of V-formation to create a chevron pattern when in place on the wheel or track.

I claim:

1. A resilient ground engaging element for mounting on an endless cyclically movable base to provide cushioning, said ground engaging element comprising a hollow longitudinal body of resiliently flexible material to extend across said base, said hollow body having a pair of longitudinal side walls, and an outer longitudinal face for contacting the ground, having first and second mounting flanges, said first mounting flange extending outwardly of said hollow body and having a mounting face to contact said base said second mounting flange being disposed between said side walls and having a face disposable in spaced relationship to said base whereby said first mounting flange of a similar, neighboring ground engaging element can be received under said face of said second mounting flange and wherein neighboring said ground engaging elements can be mounted on said base with said side walls in contact to provide mutual support under ground engaging loads.

2. A ground engaging element according to claim 1 wherein said longitudinal side faces are generally planar and approximately normal to said base.

3. A ground engaging element according to claim 1 having a junction between each side wall and one of said adjacent mounting flange said junction being curved.

4. A ground engaging element according to claim 1 wherein a stabilizing flange is provided on a side wall of said body corresponding to said first mounting flange to extend inwardly of said body.

5. A ground engaging element according to claim 1 wherein said tubular hollow body is open along a longitudinal portion thereof, said open longitudinal portion being disposed opposite to said base when said element is fixed to said base.

6. A ground engaging element according to claim 5 wherein the ends of the tubular body are open.

7. A resilient ground engaging element for mounting on an endless cyclically movable base to provide cushioning, said ground engaging element comprising a hollow longitudinal body of resiliently flexible material to extend across said base, said hollow body having a pair of longitudinal side walls, and an outer longitudinal face for contacting the ground, having first and second mounting flanges, said first mounting flange extending outwardly of said hollow body and having a mounting face to contact said base, said second mounting flange being disposed between said side walls and having a face disposable in spaced relationship to said base whereby said first mounting flange of a similar, neighboring ground engaging element can be received under said face of said second mounting flange and wherein neighboring said ground engaging elements can be mounted on said base with said side walls in contact to provide mutual support under ground engaging loads wherein a stabilizing flange is provided on a side wall of said body corresponding to said first mounting flange to extend inwardly of said body.

8. A wheel or endless band comprising a base and a plurality of ground engaging elements mounted across said base to provide a cushioning ground engaging surface, each said ground engaging element comprising a hollow longitudinal body of resiliently flexible material to extend across said base, said hollow body having a pair of longitudinal side walls, and an outer longitudinal face for contacting the ground, having first and second mounting flanges, said first mounting flange extending outwardly of said hollow body and having a mounting face to contact said base, said second mounting flange being disposed between said side walls and having a face disposable in spaced relationship to said base whereby said first mounting flange of a similar, neighboring ground engaging element can be received under said face of said second mounting flange and wherein neighboring said ground engaging elements can be mounted on said base with said side walls in contact to provide mutual support under ground engaging loads.

* * * * *